United States Patent [19]
Ramakrishnan et al.

[11] Patent Number: 5,812,384
[45] Date of Patent: *Sep. 22, 1998

[54] MATRIX FILTERS FOR LOW-NOISE POWER DISTRIBUTION SYSTEMS

[75] Inventors: Sriram Ramakrishnan, Clifton Park; Robert Louis Steigerwald, Burnt Hills; Charles Steven Korman, Schenectady, all of N.Y.

[73] Assignee: General Electric Company, Schenectady, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 767,742

[22] Filed: Dec. 17, 1996

[51] Int. Cl.$^6$ .............................. H02J 1/02; H02M 1/12; H03H 7/00
[52] U.S. Cl. .............................. 363/39; 363/47; 333/185
[58] Field of Search ...................... 363/39, 47; 333/175, 333/181, 185

[56] References Cited

U.S. PATENT DOCUMENTS

| | | | |
|---|---|---|---|
| 4,516,092 | 5/1985 | Rosenberg | 333/185 |
| 4,888,675 | 12/1989 | Kumar et al. | 363/47 |
| 5,200,810 | 4/1993 | Wojnarowski et al. | 361/398 |
| 5,327,335 | 7/1994 | Maddali et al. | 363/39 |
| 5,483,136 | 1/1996 | Marcinkiewicz | 363/47 |

*Primary Examiner*—Peter S. Wong
*Assistant Examiner*—Bao Q. Vu
*Attorney, Agent, or Firm*—Jill M. Breedlove; Douglas E. Stoner

[57] ABSTRACT

Matrix filters useful in low-noise power distribution systems include arrays of capacitors and inductors with interleaved interconnections in an high density interconnect structure so as to achieve nearly ideal performance, i.e., such that capacitor and inductor parasitics are minimized. The matrix filters are bi-directional which help to isolate different load modules by attenuating the switching noise of associated power converters as well as the noise generated by digital loads.

4 Claims, 4 Drawing Sheets

MATRIX FILTERS FOR LOW-NOISE POWER DISTRIBUTION SYSTEMS

FIELD OF THE INVENTION

The present invention relates generally to electronic filters and, more particularly, to arrays of capacitors and inductors useful as filters in low-noise power distribution systems.

BACKGROUND OF THE INVENTION

Capacitors and inductors are, of course, the critical components in passive filters. In practical applications, capacitors and inductors have associated parasitic impedances; i.e., capacitors have an equivalent series inductance and an equivalent series resistance while inductors have an equivalent series resistance and associated parallel capacitance. These parasitics, a majority of which can be associated with interconnecting the components, result in a limit on the filter attenuation that can be achieved. Unfortunately, therefore, conventional filtering techniques are not adequate for power distribution systems such as, for example, in advanced computing and signal processing systems, and phased array radar and portable communications systems.

Accordingly, it is desirable to provide approximately ideal filters for use in power distribution systems which minimize noise in power distribution buses and crosstalk between system modules. It is further desirable to provide approximately ideal common-mode and differential-mode bi-directional filters. Still further, it is desirable to reduce both conducted and radiated noise by proper power bus configuration and distribution.

SUMMARY OF THE INVENTION

In accordance with the present invention, matrix filters comprise arrays of capacitors and inductors with interleaved interconnections in an high density interconnect (HDI) structure so as to achieve nearly ideal performance, i.e., such that the capacitor parasitics (equivalent series inductance and resistance) and the inductor parasitics (shunt capacitance and series resistance) associated with interconnecting these components are minimized. As compared with conventional filters, matrix filters according to the present invention achieve a much better attenuation of high-frequency noise. In addition, these matrix filters are bi-directional which help to isolate different load modules by attenuating the switching noise of associated power converters as well as the noise generated by digital loads. Such matrix filters are useful in low-noise power distribution systems as follows: at the output of power converters, distributed along the power distribution buses, and at the point-of-entry, i.e., local to or within noise-sensitive load modules.

BRIEF DESCRIPTION OF THE DRAWINGS

The features and advantages of the present invention will become apparent from the following detailed description of the invention when read with the accompanying drawings in which:

FIG. 2b is a schematic illustration of the filter of FIG. 2a;

FIG. 3b is a schematic illustration of the filter of FIG. 3a; and

DETAILED DESCRIPTION OF THE INVENTION

Figure 1:
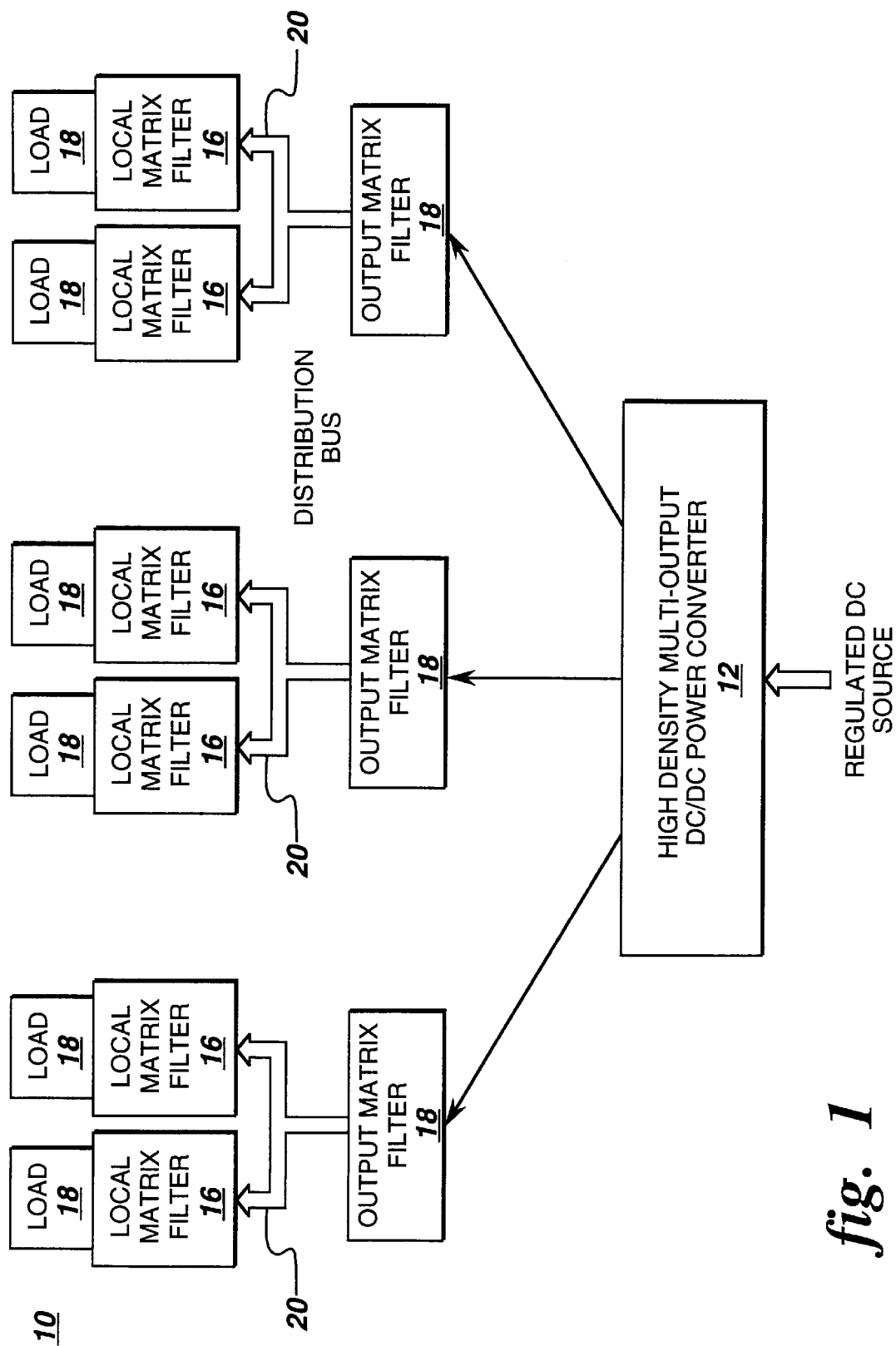
FIG. 1 is a block diagram of a low-noise power distribution scheme according to the present invention.

FIG. 1 illustrates a low-noise power distribution system 10 according to the present invention. System 10 includes a high-density multi-output dc-to-dc power converter 12 which receives power from a regulated dc source. The function of the dc-to-dc converter is to convert the regulated input voltage (e.g., 48 V) into multiple output voltages (e.g., 5 Vdc and 3.3 Vdc) with low ripple, tight regulation, and low noise. For critical module loads in some noise sensitive systems (e.g., sensitive radio frequency receivers with high pushing factors), power supply noise down in the microvolt range is needed. The two main sources of noise are the power supply and adjacent loads, such as high-speed digital circuits which require pulses of energy when switching logic levels. To achieve ultra-high attenuation of noise in accordance with the present invention, a matrix filter 14 is utilized at each output of the power converter, and a local matrix filter 16 is utilized at the point of entry near each load 18. By way of example, converter 12 is shown as having three outputs, each output being coupled to its associated output matrix filter 14. Power is distributed to loads 16 via low-noise distribution buses 20.

Figure 2A:
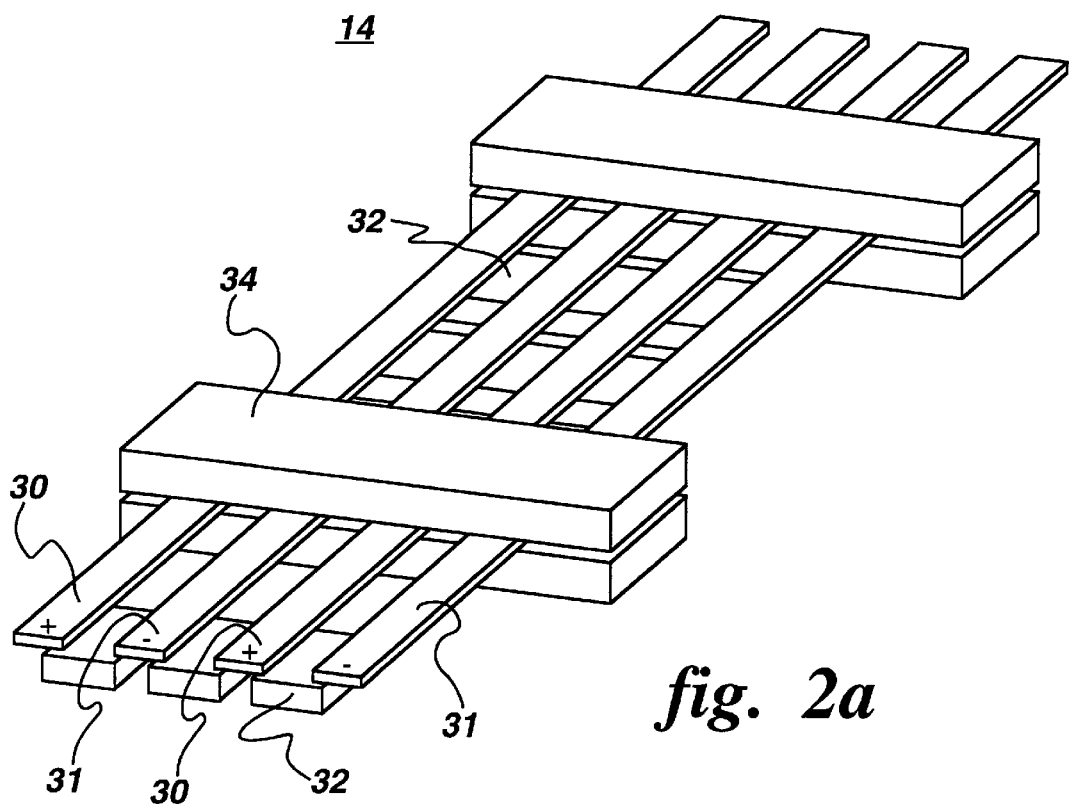
FIG. 2a illustrates an HDI implementation of a matrix low-pass filter according to the present invention.
Figure 2B:
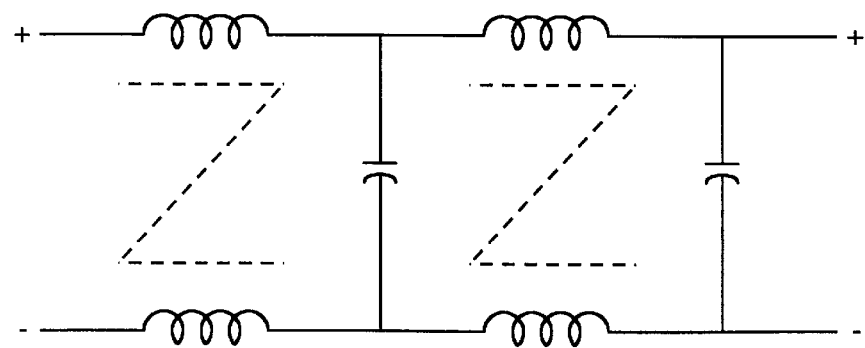

FIG. 2a illustrates an HDI implementation of a matrix low-pass common-mode/differential mode filter 14 for use at the output of the power converter. FIG. 2b is a schematic illustration of the filter of FIG. 2a.

HDI structures are described in U.S. Pat. No. 5,161,093 of Gorczyca et al., issued Nov. 3, 1992. An HDI structure comprises a ceramic substrate, such as alumina, which may be on the order of 100 mils thick, onto which semiconductor chips are deposited in a cavity (or cavities) and interconnected. HDI cavities are prepared using, for example, ultrasonic or laser milling. A thermoplastic adhesive layer, such as a polyetherimide resin available from General Electric Company under the trade name ULTEM 6000 is deposited on the bottom of the cavity (or cavities). The various components are placed in their desired locations within the cavity (or cavities), and the structure is heated to about 300° C., i.e., above the softening point of the adhesive, and then cooled to thermoplastically bond the individual components to the substrate. Thereafter, a polyimide film, such as that sold under the trade name Kapton by E.I. du Pont de Nemours and Company, is laminated across the top of the chips. Vias are provided such as by laser drilling, and a metallization layer is deposited over the polyimide film which extends into the vias and makes electrical contact to the contact pads on the electronic components. The metallization layer may be patterned to form individual conductors during its deposition, or it may be deposited as a continuous layer and then patterned using photoresist and etching. Additional dielectric and metallization layers are provided as required in order to provide all of the desired electrical connections among the chips.

As shown in FIG. 2a, the power converter buses 30 and 31 are interleaved in the horizontal plane, allowing several small capacitors 32 to be "stitched" in an array in parallel in an interleaved fashion with low equivalent series resistance and low equivalent series inductance. The inductors are implemented by sandwiching the bus between two thin ferrite core plates 34, resulting in essentially single-turn inductors with a low parasitic interwinding, i.e., shunt, capacitance. Such an inductor arrangement helps to eliminate both common-mode and differential-mode noise on the power converter output since both buses 30 and 31 are enclosed by the same ferrite cores. The matrix filter of FIGS. 2a and 2b is bi-directional, isolating the power supply and loads from each other.

Figure 3A:
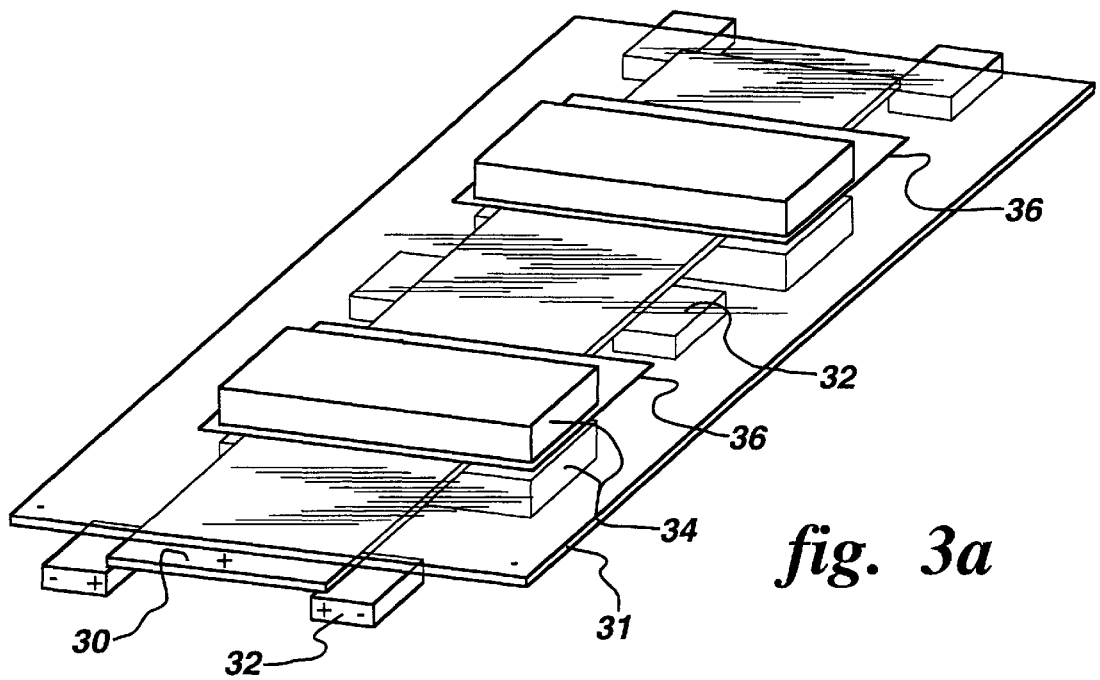
FIG. 3a illustrates an HDI implementation of a dedicated local matrix filter according to the present invention.

FIG. 3a illustrates an implementation of a dedicated local matrix differential-mode filter which can be used at the power supply output or near the noise-critical loads to further attenuate the power supply noise and to minimize the crosstalk between the different load modules. As shown, the positive and return buses, 30 and 31, respectively, are stacked vertically and interleaved to minimize radiated noise. Return bus 31 is not enclosed by the ferrite cores; this is accomplished by widening the conductor 31 and cutting out a slot 36 in the return bus. This improves the transient response between load modules by providing low impedance signal ground paths; that is, the return current does not flow through a ferrite core. (Alternatively, for some embodiments, a slot could be configured in the positive bus.) In addition, the capacitors and inductors are arranged in a matrix to provide a filter with low parasitics.

Figure 3B:
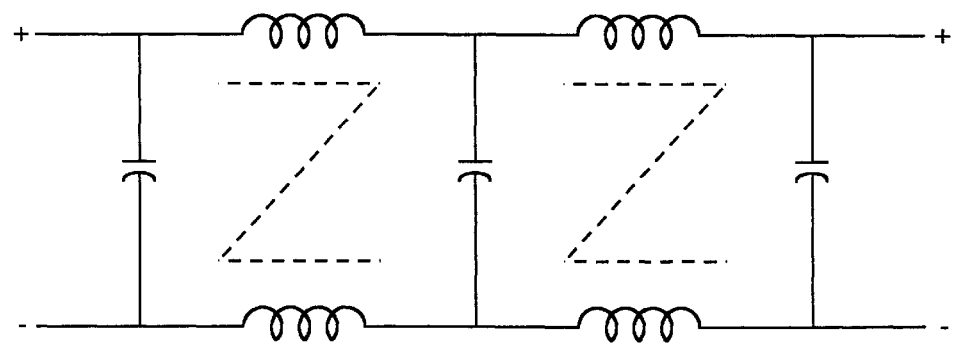
Figure 4:
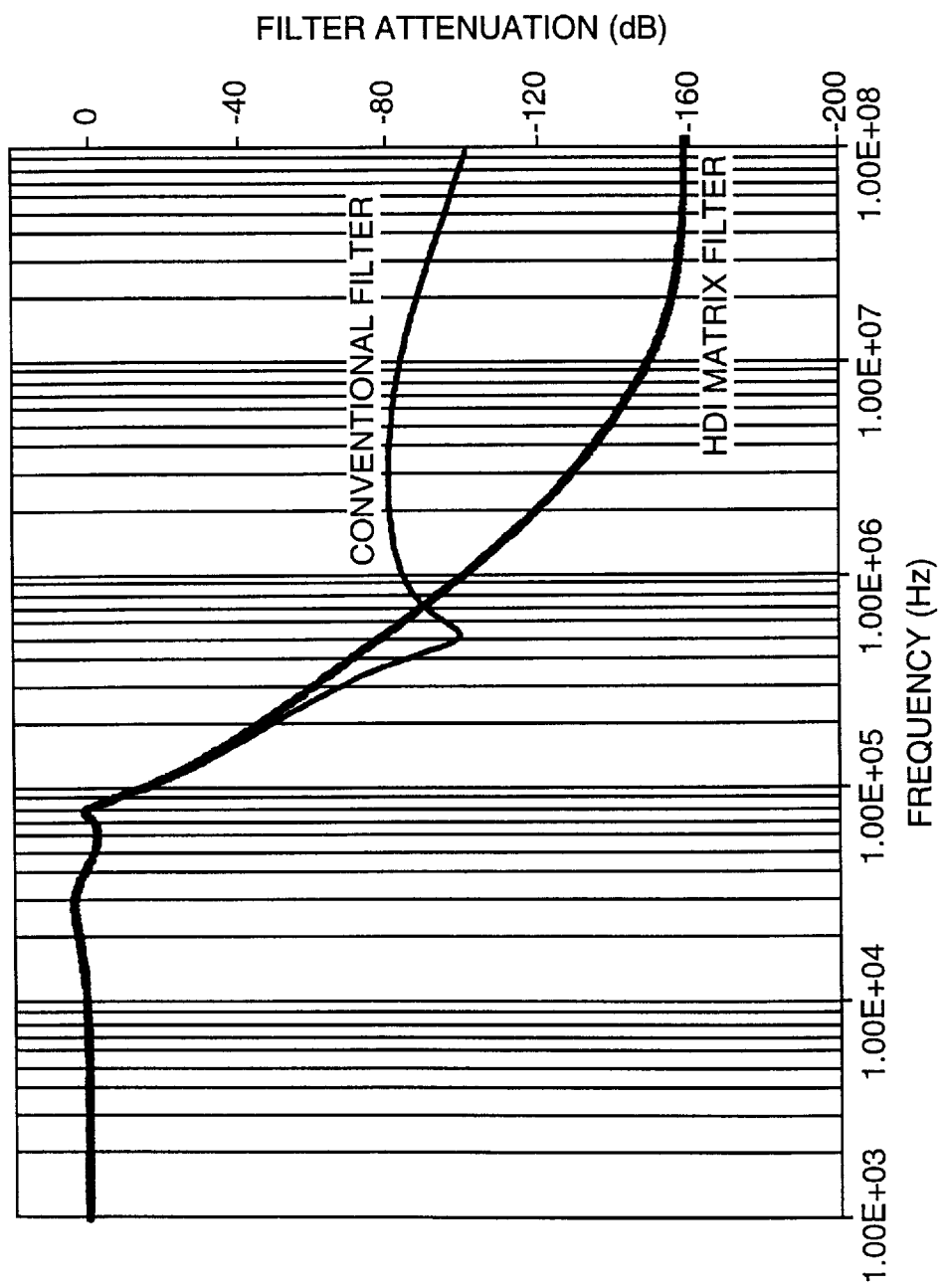
FIG. 4 graphically illustrates the attenuation response of a sample matrix filter according to the present invention as compared with that of a conventional filter.

FIG. 4 shows the simulation results of the FIG. 3 filter attenuation response for a conventional filter with its associated parasitics and a matrix filter with the low level of parasitics achieved by using interleaved connections in HDI packaging. By way of example, the HDI matrix filter as shown in FIGS. 3a and 3b can achieve −50 dB better attenuation at high frequencies as compared to the conventional filter. While the smaller individual capacitors used in the matrix filters still have some equivalent series resistance, it is much less than for a single larger capacitor. Moreover, the smaller capacitors in the matrix filter configuration of the present invention are placed in parallel in a low inductance configuration, such as shown in FIGS. 2a and 2b and FIGS. 3a and 3b in order to achieve a higher capacitance which is nearly ideal, i.e., having very low equivalent series resistance and very low equivalent series inductance.

While FIGS. 3 and 4 illustrate two-stage filters, it will be understood by those of ordinary skill in the art that multi-state filters can also be implemented using many single-stage sections of either filter shown in FIGS. 3 and 4 or their many derivatives.

For loads requiring ultra-low noise levels, a linear regulator can be used to follow the dedicated local matrix filter. Such matrix filters can also be distributed along the distribution bus to minimize the size of both the output and local filters. The power supply bus and signal lines can be located on different HDI layers and separated by ground planes to provide further shielding, thereby minimizing crosstalk between different load modules. Further, a single point ground can be used to connect the return buses of the power distribution system to minimize common ground crosstalk.

Advantageously, matrix filters comprising arrays of many small capacitors (as opposed to a single large capacitor) and inductors with interleaved interconnections according to the present invention may be employed to achieve low-noise power distribution systems as either common-mode filters, differential-mode filters, or both, to achieve high noise attenuation. Such filters can be fabricated as either stand-alone filters or filters built into either a load module or power supply module. Alternatively, such matrix filters could be built directly into a circuit substrate which receives other modules, or they could be fabricated directly into the power distribution bus bars.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A power distribution system, comprising:

a power converter for converting a regulated input voltage to multiple output voltages, each output voltage being associated with a pair of output converter buses;

an output matrix filter coupled to each output of the power converter, each output matrix filter comprising a bi-directional filter comprising an array of capacitors and inductors being configured and having interleaved interconnections such that parasitic effects of the capacitors and inductors are minimized, the capacitors being interleaved with the output converter buses in a first plane, the inductors being aligned in a second plane orthogonal to the first plane with the capacitors and output converter buses situated therebetween;

a distribution bus coupled to each output matrix filter for distributing power from each output matrix filter to a load; and a local matrix filter associated with each load, each local matrix filter comprising an array of capacitors and inductors being configured and having interleaved interconnections such that parasitic effects of the capacitors and inductors are minimized, the output converter buses being stacked vertically, one of the output converter buses having slots formed therein for receiving the cores of the inductors.

2. The power distribution system of claim 1 wherein the output matrix filters and the local matrix filters comprise HDI structures.

3. A matrix filter for connection to electrical power buses, comprising:

a bi-directional filter comprising an array of capacitors and inductors being configured in an HDI structure and having interleaved interconnections such that parasitic effects of the capacitors and inductors are minimized, the capacitors being interleaved with the electrical power buses in a single plane, the inductors comprising inductor core plates situated parallel to each other and in planes orthogonal to the plane of the capacitors and power buses, the inductor core plates having the capacitors and electrical power buses situated therebetween so as to form essentially single-turn inductors.

4. A matrix filter for connection to positive and negative electrical power buses, comprising:

an array of capacitors and inductors being configured in an HDI structure and having interleaved interconnections such that parasitic effects of the capacitors and inductors are minimized, the electrical power buses being stacked vertically and interleaved, the inductors having cores arranged so as not to overlap the negative power bus, the negative power bus having slots formed therein such that the inductor cores overlap the slots.

* * * * *